United States Patent Office 3,056,729
Patented Oct. 2, 1962

3,056,729
PROCESS FOR PREPARING L-LYSINE BY FERMENTATION OF THE CORRESPONDING DL-LACTAM
Thomas A. Seto, Groton, Conn., assignor to Chas. Pfizer & Co., Inc., Brooklyn, N.Y., a corporation of Delaware
No Drawing. Filed Nov. 29, 1961, Ser. No. 155,798
7 Claims. (Cl. 195—29)

This invention relates to a new and useful method for producing L-lysine. More particularly, it is concerned with a process for preparing L-lysine by microbiological means from the corresponding DL-lactam.

L-lysine is a well-known essential amino acid, which is specifically indispensable for human and animal nutrition. Unfortunately, this is not true of the corresponding D-isomer, which can not be metabolized by man. It is, therefore, a primary object of the present invention to provide a method for the production of L-lysine in substantially pure form, i.e., free of any contamination with the D-isomer. Another and more particular object of this invention is to provide a process for preparing L-lysine from the corresponding DL-lactam, which is readily available via conventional synthetic routes. Other objects and advantages of this invention will be apparent to those skilled in the art from the description which follows.

In accordance with the present invention, the foregoing objects have now been achieved by the surprising discovery that a certain strain of microorganism belonging to the species *Aspergillus ustus* will bring about the conversion of DL-$\alpha$-amino-$\epsilon$-caprolactam to L-lysine via a selective hydrolytic step, whereby the desired product is readily obtained in substantially pure form and in relatively high yield. More particularly, the process of this invention involves cultivating such a microorganism in an aqueous nutrient medium under submerged aerobic conditions in the presence of the DL-lactam compound and then recovering the so-produced L-lysine from the fermentation reaction mixture. A culture of this particular strain of microorganism is available in the American Type Culture Collection at Washington, D.C., where it has been assigned the number ATCC 14417.

It is to be understood that in order to operate the microbiological process of the present invention, it is clearly intended to include the use of mutants produced from *Aspergillus ustus* ATCC 14417 by various means, such as X-radiation, ultrasonic vibration, nitrogen mustards, transduction, transformation, and the like. Furthermore, there is also included within the scope of this invention the use of any new mutants or forms of *A. ustus* ATCC 14417 that are developed by such standard techniques as those described by L. S. Olive in the Americal Journal of Botany, vol. 43, Issue No. 2, pp. 97–106 (1956), and G. Pontecorvo in Advances in Genetics, vol. 5, pp. 141–238 (1953). Incidentally, the microorganisms employed in the process of this invention are all extremely simple to grow and they can easily be adapted to large scale commercial operations, particularly in view of the fact that they grow readily on very cheap media. Needless to say, the yield of L-lysine so produced in each case will vary to some extent, depending upon such reaction conditions as time, temperature and pH, the composition of the aqueous nutrient medium and the point at which the lactam substrate is added to the whole fermentation broth, as well as the concentration of the latter in said broth at that particular point.

In accordance with the process of this invention, it has been found desirable to employ cultures which are grown in or on media favorable to their development. In this connection, it is to be noted that although solid media may be utilized, liquid media are preferred for mycelial growth under aerobic conditions. For instance, such liquid media as Brewer's wort are well adapted to use under submerged aerobic fermentation conditions. For these purposes, it is necessary that the media contain suitable sources of available carbon, nitrogen and minerals so as to facilitate substantial growth of the microorganism under optimum conditions. Available carbon may be obtained from such sources as corn meal, proteins, amino acids, carbohydrates such as starches, dextrin, molasses and sugars, including glucose, fructose, mannose, galactose, maltose, sucrose, lactose, various pentoses and cerelose; while carbon dioxide, glycerol, alcohols, acetic acid, sodium acetate, etc., are illustrative of other materials which provide assimilable carbon for the energy requirements of these microorganisms. In this regard, mixtures of various carbon sources are often employed to advantage. Nitrogen may be provided in assimilable form from such suitable sources as soluble or insoluble animal and vegetable proteins, soybean meal, peanut meal, wheat gluten, cottonseed meal, lactalbumin, casein, egg albumin, peptones, polypeptides or amino acids, urea, ammonium salts and sodium or potassium nitrate; furthermore, whey, distillers solubles, corn steep liquor and yeast extract have also been found to be useful for these purposes. Among the various mineral constituents which the media may contain, either naturally present or added, are available calcium, magnesium, potassium and sodium, as well as trace amounts of chromium, cobalt, copper, iron and zinc. Sulfur may be provided by means of sulfates, free sulfur, hyposulfite, persulfate, thiosulfate, methionine, cysteine, cystine, thiamine and biotin, while phosphorus can be provided from such sources as ortho-, meta-, or pyrophosphates, salts or esters thereof, glycerophosphate, corn steep liquor and casein. Incidentally, if excessive foaming is encountered during the fermentation step, antifoaming agents such as vegetable oils may be added to the fermentation medium. In addition, suspending agents or mycelial carriers, such as filter earths, filter aids, finely divided cellulose, wood-chips, bentonite, calcium carbonate, magnesium carbonate, charcoal, activated carbon or other suspendable solid matter, methylcellulose or carboxymethyl cellulose, alginates, and the like, may also be added to the reaction mixture in order to facilitate such unit processes and operations as fermentation, aeration, filtration, and the like.

In accordance with a more specific embodiment of the process of this invention, the cultivation of microorganisms selected from the aforementioned species is generally conducted in an aqueous nutrient medium at a temperature that is in the range of from about 20° C. up to about 35° C. under submerged conditions of aeration and agitation, although the preferred temperature range is 24–30° C. The fermentation is generally continued until substantial growth is achieved and a period of about one to about five days is usually sufficient for just such purposes. The pH of the fermentation medium tends to remain rather constant, generally being in the range of from about pH 6.0 to about pH 8.0 and in most cases it remains in the pH range of approximately 6.5–7.5. However, in order to prevent variations that may occur in this respect as well as to maintain the pH of the medium in the preferred range of pH 6.8–7.0 buffering agents such as calcium carbonate may be added to the medium.

In connection with the fermentation step, it is to be noted that suitable inocula for the growth of the aforementioned microorganisms and the subsequent or concurrently occurring microbiological transformation may be obtained by employing culture slants propagated on media such as beef lactose, potato-dextrose agar or Emerson's agar. The slant washings so obtained may then be used to inoculate either shaken flasks or inoculum tanks for submerged growth or alternatively, the inoculum tanks may be seeded from the shaken flasks. The growth of the microorganism usually reaches a maximum in about two or three days, although variations in the equipment used as well as in the rates of agitation and aeration, and so forth, may affect the speed with which maximum growth is achieved. In particular, the growth rate during the fermentation stage is especially dependent upon the degree of aeration employed, the latter being effected by either surface-culture aerobic fermentation conditions or, and preferably, by submerged aerobic conditions as aforesaid. The latter operation is usually accomplished by blowing air through the fermentation medium which is simultaneously subjected to constant agitation. In general, a desirable rate of aeration for the medium is from about one-half to about two volumes of free air per volume of broth per minute, although resort may be had to such modifications as the use of subatmospheric or superatmospheric pressure; for instance, pressures of 10 lbs./sq. in. and 30 lbs./sq. in., respectively, may be employed. Incidentally, constant agitation can be conveniently achieved by the use of suitable types of agitators or stirring apparatus generally familiar to those in the fermentation industry. Needless to say, aseptic conditions must necessarily be maintained throughout the transfer of the inoculum and throughout the period of growth of the microorganism.

The DL-lactam compound as a liquid or in a solution with a suitable solvent such as water or a lower alkanol like ethanol is added to the cultivated microorganism under aseptic conditions, and the resulting medium is then agitated and aerated in order to bring about the growth of the microorganism and the concurrent or subsequent transformation of the DL-lactam substrate as the case may be. In general, a DL-lactam substrate concentration level in the range of from about 5 mg. per ml. up to about 30 mg. per ml. of the fermentation broth is usually employed in conducting the process, although it is possible that other concentration levels may sometimes be found to be equally applicable. In this connection, it is to be noted that the DL-lactam substrate may either be added when the medium is first seeded with a culture of the desired microorganism of after substantial growth of the selected organism has been established in the nutrient medium under aerobic conditions. Moreover, still other methods such as those familiar to enzyme chemists may also be utilized for conducting the present microbiological transformation process. In all these procedures, it should be kept in mind that the degree of transformation may vary depending upon whether the whole fermentation broth or only the isolated washed mycelium is used.

After completion of the fermentation and concomitant stereospecific microbiological hydrolysis step, the L-lysine product is recovered from the reaction mixture by any one of a number of different procedures convenient for just such purposes and well-known to those skilled in the art. For instance, the fermentation reaction mixture is ordinarily first filtered at this point in order to remove suspended matter and the resultant filtrate successively passed through a pair of strong synthetic cation-exchange resin columns after proper adjustment of the medium to an acidic pH had first been made in each case, as is more fully described in the experimental section to follow. Two good examples of strong synthetic cation-exchange resins in this connection would be Dowex-50 and Amberlite IR-120, both of which are more fully defined in Example I. In this manner, the mildly basic L-lysine is first recovered from the filtrate by means of adsorption on one strongly cationic column (in the sodium ion cycle) and then eluted therefrom as a sodium salt by the application of a weak base or suitable buffer such as disodium phosphate. The resultant effluent so obtained is subsequently treated with the second cationic exchange column (in the ammonium ion cycle) to leave the remaining impurities in solution, but not the L-lysine which is adsorbed on said column and subsequently eluted therefrom as an ammonium salt by means of dilute aqueous ammonia. Freeze-drying of the purified effluent then affords L-lysine as a slightly impure residual material, which can be subsequently taken up in water, acidified to a pH of about 5.0 with hydrochloric acid, treated as such with charcoal and freeze-dried once again to yield the crystalline monohydrochloride of this particular compound. Further purification can then be achieved, if so desired, by means of the conventional crystallization technique, e.g., by adding alcohol to an aqueous solution of said compound and then allowing the resultant mixture to stand until crystallization of the pure L-lysine monohydrochloride is substantially complete.

The DL-α-amino-ε-caprolactam starting material, i.e., the substrate so necessary for carrying out the process of this invention, is a known compound which is now commercially available. Its preparation may be achieved by various synthetic routes starting with the inexpensive ε-caprolactam as a point of departure. Only recently, C. M. Brenner and H. Rickenbacher in German patent specification 1,101,423 (March 9, 1961), reported a synthesis of this compound from the intermediate α,α-dichloro-ε-caprolactam, using hydroxylamine as a reagent to form the α-oximino-ε-caprolactam followed by catalytic reduction of the latter compound to yield the desired product. In this connection, it should also be noted that D-α-amino-ε-caprolactam, which is produced as a by-product in the process of the present invention, can be racemized and the resulting DL-lactam used as such for recycle purposes in the herein described hydrolytic resolution step.

This invention is further illustrated by the following examples, which are not to be construed in any way as imposing any limitations upon the scope thereof. On the contrary, it is to be clearly understood that resort may be had to various other embodiments, modifications and equivalents thereof which readily suggest themselves to those skilled in the art without departing from the spirit of the present invention and/or the scope of the appended claims.

*Example 1*

Slant washings taken from a culture of microorganism designated as *Aspergillus ustus* ATCC 14417 (isolate identified in the culture collection of Chas Pfizer & Co., Inc., under the Code No. FD 1313), were inoculated into 50 ml. of a sterial aqueous nutrient medium having the following composition:

| | Grams |
|---|---|
| Cerelose (dextrose hydrate) | 10 |
| Starch | 10 |
| NZ Amine B (enzymatic digest of casein) | 6 |
| Soybean meal | 5 |
| Yeast extract | 2 |
| Sodium chloride | 1 |
| Calcium carbonate | 1 |

Distilled water, in sufficient volume for a 1000 ml. solution.

The above inoculum had previously been adjusted to a pH of 7.0 with sodium hydroxide and then autoclaved for 45 minutes at 20 p.s.i. pressure. After the slant washings had been added to the cooled medium under asceptic conditions, the incubation was subsequently carried out at 28° C. for three days employing a rotary shaker. At the end of this time, the pH of the medium was readjusted to a value in the range of 6.5–7.5, if need be, by the addition of either dilute hydrochloric acid or sodium hydroxide, as the case may be.

A 10 ml. aliquot of this medium (i.e., the whole broth prepared as described above) was then removed and treated with 200 mg. of DL-α-amino-ε-caprolactam (20 mg./ml.) dissolved in a minimum amount of water, i.e., the lactam solution was added to the aforementioned aliquot broth. Incubation was then resumed under the same conditions as previously described for a period of 72 hours. At the end of this time, a small portion of the fermentation reaction mixture was centrifuged and the supernatant liquid stored in a refrigerator for about 16 hours. Analysis of the broth at this point (via paper chromatography using a methyl ethyl ketone-glacial acetic acid-water 1:1.25:1.5 by volume solvent system with 0.2% ninhydrin in acetone as the color reagent) revealed the presence of L-lysine to the extent of 3.92 mg./ml. This represents a 20% conversion based on the amount of DL-α-amino-ε-caprolactam starting material used.

The above fermentation reaction mixture was then combined with the contents of eight other flasks containing this same mixture at this same stage of development, and the combined contents (totalling about 80 ml. of broth) were subsequently filtered through cloth and treated with activated charcoal. Upon filtering again and washing with water, there was obtained an aqueous filtrate whose pH value was subsequently adjusted to 3.8 with dilute hydrochloric acid. The so-adjusted filtrate was then passed through a column of Dowex-50 in the sodium form (i.e., a synthetic cation-exchange resin of the sulfonated cross-linked styrene-copolymer type available from the Dow Chemical Company of Midland, Mich., and consisting of styrene copolymerized with about 16% by weight of divinylbenzene in the presence of a sulfonic acid). After washing the thusly treated resin column with water, it was subsequently eluted with 0.1 M disodium phosphate buffer at pH 8.5 to collect the fractions which showed a positive ninhydrin reaction for lysine.

These were then combined and subsequently adjusted to a pH of 3.5 before being passed through an Amberlite IR-120 ammonium resin column (i.e., a commercially available cation-exchange resin in the ammonium form of the polystyrene sulfonic acid type similar to Dowex-50, which is manufactured by the Rohm & Haas Company of Philadelphia, Pa.), which has previously been adjusted to pH 7.0 with 0.5 M phosphate buffer. After washing this resin column with water and eluting with 4% aqueous ammonia, the proper fractions (i.e., only those fractions showing a positive ninhydrin reaction and having the same $R_f$ value as lysine and none other) were collected and again combined. The latter solution was then freeze-dried under reduced pressure in order to remove the ammonia and the residue thereafter taken up in water and adjusted to pH 4.9 with hydrochloric acid. Upon treatment of this solution with activated charcoal, followed by filtration and freeze-drying, there was obtained 142 mg. of a substance having the following rotation value: $[\alpha]_D^{24°}$ +13.3° (C, 2; 0.6 N HCl). Crystallization of this material from aqueous ethanol afforded 40 mg. of pure L-lysine monohydrochloride, M.P. 249–250° C.

*Example II*

The procedure described in Example I was followed except that 50 mg. of DL-α-amino-ε-caprolactam (5 mg./ml.) was used as substrate rather than the 200 mg. amount employed in the first example. In this case, there was obtained an L-lysine broth potency of 1.4 mg./ml.

*Example III*

The procedure described in Example I was followed except that 100 mg. of DL-α-amino-ε-caprolactam (10 mg./ml.) was used as substrate rather than the 200 mg. amount employed in the first example. In this case, there was obtained an L-lysine broth potency of 3.6 mg./ml.

*Example IV*

The procedure described in Example I was followed except that 150 mg. of DL-α-amino-ε-caprolactam (15 mg./ml.) was used as substrate rather than the 200 mg. amount employed in the first example. In this case, there was obtained an L-lysine broth potency of 3.68 mg./ml.

*Example V*

The procedure described in Example I was followed except that 300 mg. of DL-α-amino-ε-caprolactam (30 mg./ml.) was used as substrate rather than the 200 mg. amount employed in the first example. In this case, there is obtained an L-lysine broth potency which is comparable to that reported previously in the aforementioned first example.

*Example VI*

The same procedure as described in Example I is followed except that the DL-α-amino-ε-caprolactam is initially present in the whole fermentation broth rather than after substantial growth of the microorganism had already been achieved. The results obtained in this manner are substantially the same as those previously reported in the first example as regards both yield and purity of product.

What is claimed is:

1. A process for preparing L-lysine, which comprises contacting DL-α-amino-ε-caprolactam with the hydrolyzing activity of the microorganism *Aspergillus ustus* ATCC 14417.

2. A process as claimed in claim 1 wherein the DL-α-amino-ε-caprolactam is subjected to the action of a growing culture of the microorganism.

3. A process as claimed in claim 1 wherein the microorganism is first cultivated in an aqueous nutrient medium under submerged aerobic conditions until substantial growth is achieved and the DL-α-amino-ε-caprolactam is then added to the resulting fermentation mixture.

4. A process for preparing L-lysine, which comprises cultivating *Aspergillus ustus* ATCC 14417 in an aqueous nutrient medium under submerged aerobic conditions in the presence of DL-α-amino-ε-caprolactam at a temperature that is in the range of from about 20° C. up to about 35° C. for a period of about one to about five days.

5. A process as claimed in claim 4 wherein the L-lysine so produced is recovered from the fermentation reaction mixture.

6. A process as claimed in claim 4 wherein the DL-α-amino-ε-caprolactam is contacted with the microorganism only after substantial growth of same has already been achieved.

7. A process as claimed in claim 4 wherein the DL-α-amino-ε-caprolactam is added to the fermentation mixture at a concentration level that is in the range of from about 5 mg. per ml. up to about 30 mg. per ml. of the fermentation broth.

No references cited.